Figure 1:
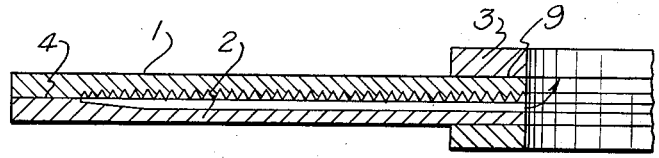

Sept. 1, 1959  A. DORNAUF  2,902,164
EXCHANGEABLE FILTER ELEMENT FOR HIGH
DIFFERENTIAL PRESSURES
Filed Nov. 3, 1955

INVENTOR

Arnold Dornauf

BY

Bailey, Stephens & Huettig
ATTORNEYS

2,902,164

EXCHANGEABLE FILTER ELEMENT FOR HIGH DIFFERENTIAL PRESSURES

Arnold Dornauf, Oberhochstadt, Germany, assignor to Faudi Feinbau G.m.b.H., Oberursel (Taunus), Germany Application November 3, 1955, Serial No. 544,790

Claims priority, application Germany November 13, 1954

1 Claim. (Cl. 210—486)

This invention relates to filter elements for high differential pressures.

The object of the invention is to produce an exchangeable filter element which is inexpensive, and which can be replaced by new filters at less cost than the expense of cleaning the used filter.

In the high-grade filtration of oils and other liquids, the filter elements are stacked in an internal casing, which can be removed from an outer casing, so that the filter elements can either be cleaned or replaced by new filter material, and the internal casing then reset in the outer casing. This procedure has the disadvantage that neither the filter material nor the other parts of the entire filter unit are cleaned sufficiently, and that the clean filter discs may be damaged, or not properly inserted within the casing, for example, the filter elements may be inserted upside-down with the clean face in the position of an unclean face. This results in that the particles of dirt may get into the liquid being filtered, and thus lead to accidents which could be serious, as the stalling of airplane engines.

Attempts have been made to eliminate these disadvantages by constructing filter elements of simple cardboard discs, which after being used are removed from the filter casing and discarded. This means is adequate where there are only small differential pressures between the upper and lower sides of the filter, and a relatively low rate of liquid flow through the filter. However, these cardboard discs are not adequate for use with the high differential pressures encountered in modern machinery, such pressures alone resulting in an economical use of the filter material. Such higher differential pressures are used with a high liquid flow, and the demand is for small filters. Filter discs of paper or cardboard which are supported only at their edges or by individual ribs are not adequate as they either become pressed together and stop the liquid flow, or are torn. Wire fabrics are too expensive, since they cannot be reused. The art has also suggested the use of circular cardboard discs having eight ribs between which the cardboard should be flexible, but these discs are not suitable for high differential pressures, as for example of five atmospheres. Furthermore, cardboard elements in which the liquid to be filtered is passed internally of the discs will not stand such high pressures, since the liquid acts as a wedge penetrating between the two filter elements and tends to separate the edges thereof. In a filter element having a disc diameter of 300 mm., an axial pressure occurs of 700 kg. per one atmosphere of differential pressure.

In the present invention the filter elements are composed of filter paper or cardboard having one or both sides thoroughly indented, the discs being hardened by conventional means, or being assembled in pairs with their indented inner facing surfaces being arranged so that the indentations cross each other and form discharge channels, the outer edges of the ribs of the facing discs being secured to each other.

Figure 2:
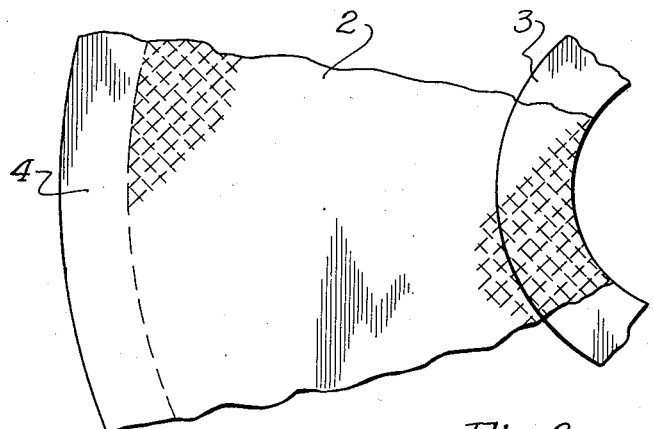
Figure 3:
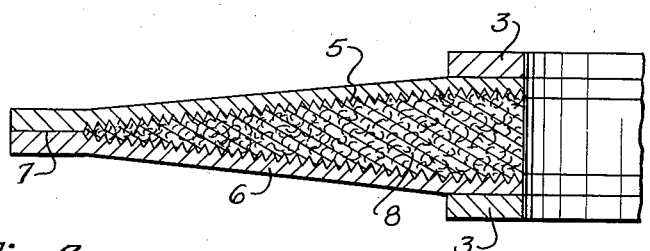

The means by which the objects of the invention are obtained, are described more fully with reference to the accompanying drawings, in which:

Figure 1 is a cross-sectional view of filter elements constructed according to the invention, Figure 2 is a partial plan view of a filter element shown in Figure 1, and Figure 3 is a cross-sectional view of a modified form of the filter elements.

In Figure 1 the filter element is composed of a pair of cardboard discs 1 and 2 respectively. The facing surfaces of the discs are indented with the indentations crossing each other as shown in Figure 2. In assembly, the filter elements are stacked one above the other, and separated by rings 3 which are inserted into or glued to the filter elements.

Discs 1 and 2 are impregnated with a reinforcing or binding medium. The circumferential edge surfaces are flat and are secured together by adhesive 4. Pairs of discs are first put together, and then hardened to form a unitary filter element, and at the same time the outer edges of the facing ribs are adhesively secured. In this manner, the durability of the filter element is considerably increased, which would not occur if only the outer edges of the ribs merely contacted each other. Between the spacing rings 3, the supporting areas 9 are compressed and smoothed and also provided with the reinforcing or binding agent, and then this area set with adhesive. Furthermore, a plurality of filter elements can be assembled on a support such as a perforated tube, and then compressed between two terminal discs so that a tight seal is obtained between the supporting ribs of the individual filter elements.

The arrows indicate the direction of the flow of the liquid to be filtered, it being noted that the direction of the liquid tends to compress the discs 1 and 2 against each other.

In another form of the invention, as shown in Figure 3, the two cardboard filter discs 5 and 6 are separated by a filling of porous material 8 such as cardboard fibers. Both the discs 5 and 6 and the material 8 are impregnated with a reinforcing and binding medium and the entire unit is hard-set simultaneously. The edges of the discs are smooth, and are united by means of adhesive at the time the unit is hardened.

The filter discs 1, 2, 5 and 6 are composed of a paperlike or cardboardlike material of cotton linters, cellulose, or a mixture of both. The discs have pores of from about 1 to 20 microns ($\frac{1}{1000}$ to $\frac{20}{1000}$ mm.), depending on the type of liquid to be filtered.

The material 8 is composed of the same matter, but preferably has a longer staple, or is in the form of granules.

The reinforcing and binding material used to impregnate the discs and seal the various edges is composed of phenol formaldehyde or silicone-type resins, which are applied to the discs in a solution, and then thermoset at a heat of, for example, about 140° C.

The filter elements described, being made of cardboard impregnated with a thermo-setting adhesive, are so inexpensive that they can be replaced, after being used, by new filter elements at less cost than that of cleaning the old elements.

Having now described the means by which the objects of the invention are obtained,

I claim:

An exchangeable filter element comprising two porous cardboard discs impregnated with a thermosetting adhesive, ribs on each disc with the ribs of one disc crossing and contacting the ribs of the other disc for supporting and spacing the interfaces of the discs and forming drainage channels to the center portions of said discs, and the circumferential edges and contacting ribs of said discs being secured to each other by said thermosetting adhesive.

References Cited in the file of this patent

UNITED STATES PATENTS

| | | |
|---|---|---|
| 1,726,035 | Loew | Aug. 27, 1929 |
| 2,304,618 | Williams | Dec. 8, 1942 |
| 2,435,115 | Alsop | Jan. 27, 1948 |
| 2,654,440 | Robinson | Oct. 6, 1953 |